United States Patent [19]

Kumagai

[11] 4,356,285
[45] Oct. 26, 1982

[54] THERMOSETTING RESIN COMPOSITION

[75] Inventor: Yugo Kumagai, Hitachi, Japan

[73] Assignee: Hitachi Chemical Co., Ltd., Tokyo, Japan

[21] Appl. No.: 304,063

[22] Filed: Sep. 21, 1981

[30] Foreign Application Priority Data

Sep. 19, 1980 [JP] Japan .................................. 55/131327
Sep. 19, 1980 [JP] Japan .................................. 55-131329

[51] Int. Cl.³ .......................... C08L 63/00; C08L 67/00
[52] U.S. Cl. ..................................... 525/111; 525/176; 525/411; 525/438; 525/934
[58] Field of Search ................. 525/438, 111, 176, 411

[56] References Cited

U.S. PATENT DOCUMENTS

| | | | |
|---|---|---|---|
| 2,944,996 | 7/1960 | Berenbaum | 525/438 |
| 3,052,647 | 9/1962 | Pietsch | 525/111 |
| 3,699,070 | 10/1972 | Wynstra | 525/438 |
| 4,018,848 | 4/1977 | Khanna | 525/438 |
| 4,086,294 | 4/1978 | Koleske | 525/411 |

*Primary Examiner*—Paul Lieberman
*Attorney, Agent, or Firm*—Frishauf, Holtz, Goodman & Woodward

[57] ABSTRACT

A new thermosetting resin composition is provided. The composition is characterized by the use of an epoxy group-containing polyester resin and a hardener having two or more carboxy groups. The epoxy group-containing polyester resin may be prepared by reacting an epoxy ester resin intermediate having both epoxy and alkyl ester groups (which, in turn, may be prepared by reacting a polyepoxy compound having at least two epoxy groups with a monoalkyl terephthalate) with a hydroxy group-containing polyester resin.

The composition is particularly suitable for powder coatings. By using the thermosetting resin composition, powder coatings exhibit superior coated film properties, such as weatherdurability, corrosion resistance, mechanical properties and anti-blocking property. Further, as the composition contains no volatile constituents upon hardening when applied to powder coatings, no environmental pollution takes place.

11 Claims, No Drawings

4,356,285

THERMOSETTING RESIN COMPOSITION

BACKGROUND OF THE INVENTION

The present invention relates to a thermosetting resin composition containing little content volatile at the time of curing of the composition and being suitable especially for powder coatings having superior hardened film properties such as mechanical, corrosion resistance and exterior durability, as well as superior anti-blocking property, and a process for an epoxy-group containing polyester which is useful for the production of said resin composition.

Powder coatings possess properties superior to conventional solvent type coatings having regard to fire hazzard, environmental pollution, saving of resources and energy, and so on. Their applicational field has been extended to coating of household appliances and cars, in conjunction with remarkable improvement in the capacity of coatings and installations and techniques of coating.

Heretofore, thermoplastic resins represented by polyvinyl chloride and polyethylene resins have been used as materials for powder coatings.

Recently, thermosetting resins such as epoxy, acrylic and polyester resins have principally been used as materials for powder coatings in view of their excellent film properties and operation efficiency.

While powder coatings using an epoxy resin as material possess an excellent corrosion resistance, they are not suitable for outdoor application due to their extremely poor weatherability.

Likewise, while powder coatings using an acrylic resin possess an excellent exterior durability, they are poor in corrosion resistance and mechanical properties.

Thus, neither epoxy resins nor acrylic resins has well-balanced properties as materials for powder coatings.

In view of above, powder coatings contaning a polyester resin, in which various hardeners may jointly be used, as material have been widely used, regardless of outdoor or indoor application, due to their well-balanced exterior durability, corrosion resistance and mechanical properties.

Polyester resins may be classified into two groups, namely one having hydroxy groups as the functional groups and another having carboxy groups as the functional groups.

Where functional groups of polyester resins are hydroxy groups, there may be employed such hardeners as blocked polyisocyanate compounds, N-acylpolylactam compounds or amino resins.

Powder coatings containing the hardening system, however, involve disadvantages that, due to evaporation, upon hardening, of a blocking agent such as ε-caprolactam or phenyl which deactivates functional groups of the hardener at ambient temperature, or of a product formed by condensation reaction such as methanol, butanol or water, the advantage attained by the use of powder coatings may be somewhat impaired and that the aimed film thickness may not be obtained by a single coating operation, owing to the foaming phenomemon within the hardened film.

Where functional groups of polyester resins are carboxy group, there may be employed such hardeners as polyoxazoline compounds or polyepoxy compounds.

Powder coatings containing the hardening system would be ideal in that there occurrs no evaporation of blocking agents or condensates upon hardening.

Powder coatings using a polyoxazoline compound as the hardener, however, tend to lose the coating property due to deactivation of the polyoxazoline compound by the influence of water in air.

There are widely used, bisphenol type epoxy resins as the epoxy compound.

Powder coatings containing a bisphenol type epoxy resin as the hardener may be classified into two groups, namely one containing relatively small amount of an epoxy resin with a low epoxy equivalent such as Epikote 828 or Epikote 834 (Shell Co.), and another containing approximately equal amount of an epoxy resin to the polyester resin with a high epoxy equivalent such as Epikote 1004 or Epikote 1007 (Shell Co.).

Although powder coatings using an epoxy resin with a low epoxy equivalent possess a good exterior durability, they are poor in the anti-blocking property due to the fact that such epoxy resin is liquid.

On the contrary, powder coatings using a solid epoxy resin with a high epoxy equivalent possess a good anti-blocking property. However, they are poor in exterior durability owing to the large amount of the epoxy resin in the coatings.

An ideal powder coating would be such that there is no volatile content upon hardening in it and that it has superior coated film properties, particularly excellent exterior durability, corrosion resistance, mechanical properties and anti-blocking property.

There has been no thermosetting resin composition that satisfies all of the requirements, hence, it has long been waited to solve the above-mentioned problems.

The present inventors paid attention to the combination of epoxy groups and carboxy groups for the hardening system containing no volatile component, and have solved the above-mentioned problems by introducing epoxy groups into a polyester resin. Namely, the above-mentioned problems have been caused since the functional groups of conventional polyesters have been confined to hydroxyl group and carboxyl group. If epoxy groups can be introduced into a polyester resin, an aliphatic carboxylic acid such as sebacic acid and dodecanedioic acid, a carboxyl-group containing polyester and a carboxyl-group containing acrylic resin may be used as a hardener, thus offering ideal thermosetting resin compositions for powder coatings.

SUMMARY OF THE INVENTION

It is, therefore, an object of the invention to provide thermosetting resin compositions containing as the main components (A) an epoxy group-containing polyester resin obtained by reacting a hydroxy group-containing polyester resin with an epoxy ester resin intermediate having both epoxy and alkyl ester groups, which intermediate being obtained, in turn, by reacting a polyepoxy compound and a monoalkyl terephthalate, and (B) a hardener containing two or more carboxy groups.

It is another object of the invention to provide a process for preparing such epoxy group-containing polyester resins.

Other objects of the invention will become clear as the description proceeds.

DETAILED DESCRIPTION OF THE INVENTION

The polyepoxy compounds, which are a constituent of the above-mentioned epoxy ester resin intermediates, are compounds having two or more epoxy groups in the molecule and include:

bisphenol type epoxy resins obtained by reacting a bisphenol, like bisphenol A, with epichlorohydrin; hydrogenated bisphenol A type resins obtained by reacting a hydrogenated bisphenol, like hydrogenated bisphenol A, with epichlorohydrin;

polyglycidyl ester type epoxy resins such as diglycidyl terephthalate, diglycidyl isophthalate, diglycidyl hexahydrophthalate, diglycidyl tetrahydrophthalate or diglycidyl endomethylenetetrahydrophthalate;

glycidyl ester ether type epoxy resins like p-hydroxybenzoic acid glycidyl ester ether;

tris(2-epoxypropyl)isocyanurate; and acrylic resins containing oxirane groups, preferably having the molecular weight of 3,000–30,000, obtained from 5 to 20% by weight of glycidyl acrylate or methacrylate and 95 to 80% by weight of one or more unsaturated monomers which are copolymerizable therewith.

Such monomers copolymerizable with glycidyl acrylate or methacrylate include: alkyl acrylates such as methyl acrylate, ethyl acrylate, propyl acrylate, butyl acrylate or 2-ethylhexyl acrylate; corresponding alkyl esters of methacrylic acid; hydroxyalkyl acrylates such as 2-hydroxyethyl acrylate, 2-hydroxypropyl acrylate or 2-hydroxybutyl acrylate; and corresponding hydroxyalkyl esters of methacrylic acid; styrene series monomers such as styrene, vinyl toluene, p-tert-butylstyrene or α-methylstyrene; unsaturated nitriles such as acrylonitrile or methacrylonitrile; unsaturated amides of acrylic or methacrylic acid such as acrylamide or methacrylamide; acrylic acid or methacrylic acid; vinyl esters like vinyl acetate; and vinyl halides like vinyl chloride.

They may be used alone or jointly. Of these monomers, alkyl acrylate and methacrylate, and styrene series monomers are preferred.

The monomer having functional groups reactive with glycidyl groups is preferably used in amount of less than 5% by weight, based on the total amount of monomers.

Thereof, industrially preferred are bisphenol type epoxy resins such as Epikote 828, Epikote 834 and Epikote 1001 (Shell Co.), hydrogenated compounds thereof, and tris(2-epoxypropyl)isocyanurate.

Monoalkyl terephthalates include monomethyl terephthalate, monoethyl terephthalate and monobutyl terephthalate, preferably monomethyl terephthalate for the industrial applicability.

The ratio of polyepoxy compound to monoalkyl terephthalate should be such that the epoxy ester resin intermediate to be obtained by the reaction of epoxy and carboxy groups contains at least one epoxy group. For this, the reaction should be performed under such a condition that the equivalent ratio of a mono-lower-alkyl terephthalate to a polyepoxy compound is from $0.8/n$ to $1.2(n-1)/n$ (in which n is a mean number of epoxy groups in one molecule of polyepoxy compound), more preferably from $1/n$ to $n-1/n$.

Although, the reaction may be performed outside the range of the ratio it is undesirable that an unreacted polyepoxy compound remains in the reaction mixture or that the number of epoxy groups in the epoxy ester intermediate (A') is too small (i.e. small number of crosslinking points).

The reaction of a polyepoxy compound with a mono-lower-alkyl terephthalate may be conducted in a reaction vessel at a temperature of 40°–230° C., preferably 60°–150° C. in the absence or presence of 0.01–5%, preferably 0.05–1% by weight of a catalyst, based on the total weight of starting materials, such as amines (e.g. ethanolamines, diethylamine, dibutylamine, piperidine, morpholine, diphenylamine, triethylamine or pyridine), salts of amine (e.g. diethylamine hydrochloride or dimethylamine acetate), quaternary ammonium salts (e.g. dimethyldiphenylammonium chloride, dodecyldimethylbenzylammonium bromide, tetraethylammonium chloride, tetrahexylammonium chloride, dodecyltrimethylammonium chloride or triethylphenylammonium chloride) or inorganic salts (e.g. trisodium phosphate, sodium acetate, sodium sulfate or sodium chlorate).

There is no limitation as to the nature of carboxylic acid, which is another component of the hydroxy group-containing polyester resins according to the invention.

Such carboxylic acids include: malonic acid, succinic acid, glutaric acid, adipic acid, azelaic acid, sebacic acid, dodecanedioic acid, dimeric acid, phthalic acid, isophthalic acid, dimethyl isophthalate, terephthalic acid, monomethyl terephthalate, dibutyl terephthalate, dimethyl terephthalate, tetrahydrophthalic acid, methyltetrahydrophthalic acid, haxahydrophthalic acid, methylhexahydrophthalic acid, endomethylenetetrahydrophthalic acid, endomethylenehexahydrophthalic acid, naphthalenedicarboxylic acid, diphenolic acid, trimellitic acid, pyromellitic acid, trimesic acid, cyclopentanedicarboxylic acid, 3,3',4,4'-benzophenonetetracarboxylic acid, 1,2,3,4-butanetetracarboxylic acid, 2,2'-bis(4-carboxyphenyl)propane, the diimidocarboxylic acid obtained from trimellitic acid anhydride and 4,4'-diaminophenylmethane, tris($\beta$-carboxyethyl)isocyanurate, and isocyanurate ring-containing polyimidepolycarboxylic acids such as those obtained from a trimeric compound of tolylenediisocyanate, xylylenediisocyanate or isophoronediisocyanate and trimellitic acid anhydride.

Alcohols include: ethylene glycol, diethylene glycol, triethylene glycol, polyethylene glycol, propylene glycol, dipropylene glycol, isopentyl glycol, hydrogenated bisphenol A, 1,3-butanediol, 1,4-butanediol, 1,6-hexanediol, neopentyl glycol, xylene glycol, 1,4-cyclohexanedimethanol, glycerol, trimethylolethane, trimethylolpropane, pentaerythritol, bis($\beta$-hydroxyethyl)terephthalate, tris($\beta$-hydroxyethyl)isocyanurate and 2,2,4-trimethylpentane-1,3-diol.

Hydroxycarboxylic acids include: p-hydroxybenzoic acid, vanillic acid, p-hydroxymethylbenzoic acid, 5-hydroxyisophthalic acid, dimethylolpropionic acid, malic acid and tartaric acid.

The above-mentioned starting materials may be used in the form of the ester-forming derivatives.

The starting materials are to be employed so that the hydroxyl equivalent is in excess.

The acid value of hydroxy group-containing polyester resin obtained should be regulated below 20, preferably below 10 (KOH mg/g).

Also, the hydroxyl value should be regulated from 20 to 200, preferably from 30 to 150.

The epoxy groups will be consumed by the reaction with the carboxyl groups, upon addition of the polyester resin intermediate; consequently the epoxy content in the epoxy group-containing polyester resin becomes undesirably low, if the acid value is above 20 (KOH mg/g).

The amount of epoxy ester resin intermediate (A) to be contained will become too small, hence, the number of crosslinking points in the epoxy group-containing polyester resin finally obtained will become low, if the hydroxyl value is less than 20. On the contrary, flexibility will be damaged, if the value is above 200.

The hydroxy group-containing polyester resin may be prepared, for example, as follows.

Starting materials are placed in a reaction vessel and the reaction is initiated by heating the system at 160°–190° C., introducing an inert gas like nitrogen to the reaction system. During the reaction, the condensate co-produced is removed continuously from the reaction system. Several hours after the initiation of the reaction, the temperature is elevated to 200°–250° C. to promote the reaction and obtain the aimed hydroxy group-containing polyester resin.

In order to further promote the reaction, there should be employed such a catalyst as organic metals (e.g. dibutyltin dilaurate, dibutyltin dioctanoate, dibutyltin oxide) or metal alkoxide (e.g. tetrabutyl titanate) in amount of 0.1–1% by weight, if the reaction is esterification, and such a catalyst as metal oxide (e.g. zinc oxide, antimony oxide), metal acetate (e.g. zinc acetate, calcium acetate, lead acetate, magnesium acetate) or metal alkoxide in amount of 0.005–0.05% by weight, if the reaction is transesterification.

The reaction of above-mentioned epoxy ester resin intermediate and hydroxy group-containing polyester resin to produce the epoxy group-containing polyester resin may be conducted by mixing the both materials at 180°–230° C. in the presence of a transesterification catalyst such as zinc oxide, zinc acetate, calcium acetate or tetrabutyl titanate, preferably in the atmosphere of an inert gas like nitrogen, removing continuously the co-produced lower alcohol.

Softening point of the thus obtained epoxy group-containing ester resin, when used for powder coatings, is adjusted to 50°–200° C., preferably 70°–150° C.

For this, it is preferable that an aromatic carboxylic acid is used in amount of at least 70 mole % (where an aromatic hydroxycarboxylic acid is employed, it is also included in the aromatic carboxylic acid) of the total carboxylic acids.

The anti-blocking property of powder coatings will be damaged, if a resin having softening point of less than 50° C. is used. On the contrary, smoothness of powder coatings will be damaged, if a resin having the softening point of more than 200° C. is used.

The ratio of above-mentioned epoxy ester intermediate (A') to hydroxy group-containing polyester resin (B') is to be regulated from 20/80 to 80/20, preferably from 30/70 to 70/30 by weight.

If the ratio (A')/(B') is below 20/80, the degree of cross-linking will be too low, owing to the small number of epoxy groups. On the contrary, if the ratio (A')/(B') is above 80/20, flexibility will be damaged.

There is no special limitation as to the nature of hardeners as the component (B), provided that two or more carboxy groups are contained in one molecule.

Such polycarboxylic acids include:
aromatic polycarboxylic acids such as phthalic acid, tetrahydrophthalic acid, trimellitic acid or pyromellitic acid;

acid anhydrides of the aromatic polycarboxylic acids; aliphatic polycarboxylic acids such as adipic acid, sebacic acid, dodecanedioic acid or 1,2,3,4-butanetetracarboxylic acid; and, polyester resins or acrylic resins containing carboxy groups.

Where mechanical properties are particularly required, it is preferable to use an aliphatic polycarboxylic acid, especially dodecanedioic acid or 1,2,3,4-butanetetracarboxylic acid or a carboxy group-containing polyester resin having the number mean molecular weight of 1,000–5,000 and acid value of 20–200, more preferably 30–100, whereby desired mechanical properties, anti-blocking property and levelling property may be obtained. As the starting material, those used for the preparation of above-mentioned hydroxy group-containing polyester may also be used.

Where stain resistance is particularly required, it is preferable to use a carboxy group-containing acrylic resin to be obtained from acrylic or methacrylic acid and a monomer copolymerizable therewith, and having the number mean molecular weight of 3,000—30,000 and acid value of 20–200.

Such monomers copolymerizable with acrylic or methacrylic acid include:
alkyl acrylates such as methyl acrylate, ethyl acrylate, propyl acrylate, butyl acrylate or 2-ethylhexyl acrylate;
the corresponding alkyl esters of methacrylic acid;
hydroxyalkyl acrylates such as 2-hydroxyethyl acrylate, 2-hydroxypropyl acrylate or 2-hydroxybutyl acrylate;
the corresponding hydroxyalkyl esters of methacrylic acid;
styrene series monomers such as styrene, vinyl toluene, p-tert-butylstyrene or α-methylstyrene;
unsaturated nitriles such as acrylonitrile or methacrylonitrile;
unsaturated amides of acrylic or methacrylic acid such as acrylamide or methacrylamide;
glycidyl acrylate or methacrylate;
vinyl esters like vinyl acetate; and
vinyl halides like vinyl chloride.

They may be used alone or jointly. Of these monomers, alkyl acrylate and methacrylate, and styrene series monomers are preferred.

The monomer having functional groups reactive with carboxy groups is preferably used in amount of less than 5% by weight, based on the total amount of monomers.

It is possible, as a matter of course, to adjust various properties slightly by blending the above-mentioned hardeners.

The ratio of epoxy group-containing polyester resin (A) to the hardener (B), i.e. (A)/(B) by weight, should be from 20/80 to 95/5, preferably from 30/70 to 90/10.

Degree of crosslinking will be insufficient, if the ratio exceeds 95/5. On the contrary, exterior durability will be damaged, if the ratio is below 20/80, owing to the remaining unreacted carboxy groups.

The resin compositions according to the invention may contain, if necessary, coloring agents, pigments, fillers, flow control agents, reactive accelerator, and the like.

Preparations, Examples and Comparisons, in which parts are all by weight, will be given hereunder to further illustrate the invention. They should not be construed as limiting the range of the invention.

PREPARATION 1

(1) Epoxy ester resin intermediate

760 Parts of Epikote 828, 360 parts of monomethyl terephthalate and 1.1 parts of dodecyldimethylbenzylammonium chloride were placed in a reaction vessel and reacted at 90° C. for 8 hours to give a polyester resin intermediate having both epoxy and methyl ester groups.

(2) Hydroxy group-containing polyester resin

677 Parts of dimethyl terephthalate, 380 parts of neopentyl glycol, 12 parts of 1,6-hexanediol, 15 parts of 1,4-cyclohexanedimethanol, 13 parts of trimethylolethane and 1 part of zinc acetate were placed in a reaction vessel and heated at 170° C. for 3 hours, while removing the co-produced methanol from the reaction system. Then the mixture was heated at 220° C. for 6 hours to proceed with the reaction, affording a hydroxy group-containing polyester resin having the hydroxyl value of 74.

(3) Epoxy group-containing polyester resin

1120 Parts of the epoxyester resin intermediate, 1500 parts of the hydroxy group-containing polyester resin and 2 parts of tetrabutyl titanate were placed in a reaction vessel and heated at 220° C. to proceed with the transesterification reaction, affording an epoxy group-containing polyester resin having the epoxy equivalent of 1278 and the softening point of 114° C.

EXAMPLE 1

90 Parts of the epoxy group-containing polyester resin obtained in Preparation 1, 10 parts of dodecanedioic acid, 0.7 part of Modaflow (acrylic polymer, Monsanto Co.), 0.5 part of benzoin, 45 parts of titanium white (rutile structure) and 0.1 part of 2-methylimidazole were dry-blended with a mixer at 1,000 rpm for 10 minutes, then melt-blended with Ko-kneader PR-46 (Buss Co.). The blended mixture was cooled rapidly, pulverized and classified to give a powder coating of below 150 mesh.

The powder coating was coated on a zinc phosphate-treated steel plate by static spraying to give the thickness of 60 μm which was sintered at 180° C. for 20 minutes, affording test pieces.

PREPARATION 2

(1) Epoxy ester resin intermediate

594 Parts of tris(2-epoxypropyl)isocyanurate, 360 parts of monomethyl terephthalate and 0.9 part of dodecyldimethylbenzylammonium chloride were placed in a reaction vessel and reacted at 100° C. for 5 hours to give a polyester resin intermediate having both epoxy and methyl ester groups.

(2) Hydroxy group-containing polyester resin

640 Parts of dimethyl terephthalate, 431 parts of neopentyl glycol, 8 parts of 1,6-hexanediol, 13 parts of trimethylolpropane and 1 part of zinc acetate were reacted to give a hydroxy group-containing polyester resin.

(3) Epoxy group-containing polyester resin

954 Parts of the polyester resin intermediate, 800 parts of the hydroxy group-containing polyester resin and 2 parts of tetrabutyl titanate were placed in a reaction vessel and heated at 220° C. to proceed with the transesterification reaction, affording an epoxy group-containing resin having the epoxy equivalent of 439 and the softening point of 107° C.

PREPARATION 3

Carboxy group containing polyester resin

1161 Parts of terephthalic acid, 267 parts of ethylene glycol, 585 parts of neopentyl glycol, 24 parts of 1,6-hexanediol, 56 parts of trimethylolpropane and 10 parts of dibutyltin oxide were placed in a reaction vessel, heated first at 180° C. for 5 hours then at 220° C. for 10 hours to proceed with the reaction. Then, 320 parts of monomethyl terephthalate and 1 part of zinc acetate were added to the reaction mixture, and the whole mixture was heated at 220° C. for 10 hours to give a carboxy group-containing polyester resin having the acid value of 49 (KOH mg/g) and the softening point of 115° C.

EXAMPLE 2

Following the method in Example 1, but using 30 parts of the epoxy group-containing polyester resin obtained in Preparation 2, 70 parts of the carboxy group-containing polyester resin obtained in Preparation 3, 0.7 part of Modeflow, 0.5 part of benzoin, 45 parts of titanium white (rutile type) and 0.1 part of 2-methylimidazole, there was obtained a powder coating. By using the coating, test pieces were prepared.

PREPARATION 4

(1) Hydroxy group-containing polyester resin

655 Parts of dimethyl terephthalate, 401 parts of neopentyl glycol, 12 parts of 1,6-hexanediol, 15 parts of 1,4-cyclohexanedimethanol, 12 parts of trimethylolethane and 1 part of zinc acetate were placed in a reaction vessel and reacted in the same manner as in Preparation 1, to give a polyester resin having the hydroxyl value of 110.

(2) Epoxy group-containing polyester resin

560 Parts of the epoxy ester-containing resin intermediate obtained in Preparation 1, 477 parts of the epoxy ester resin composition obtained in Preparation 2, 1000 parts of the hydroxy group-containing polyester resin obtained in Preparation 4 and 2 parts of tetrabutyl titanate were placed in a reaction vessel and subjected to transesterification reaction, giving an epoxy group-containing polyester resin having the epoxy equivalent of 679 and the softening point of 111° C.

PREPARATION 5

Carboxy group-containing acrylic resin

1600 Parts of ethyl cellosolve were placed in a reaction vessel and heated at 120° C., then 133 parts of styrene, 117 parts of butyl acrylate, 50 parts of methyl methacrylate, 33 parts of methacrylic acid and 8 parts of azobisisobutyronitrile were added dropwise thereto over 2 hours. The mixture was kept at 130° C. for 7 hours, then poured into a large amount of water to precipitate the reacted copolymer. By drying the product at 60° C. below 5 mmHg for 15 hours, there was obtained a carboxy group-containing acrylic resin having the acid value of 78 (KOH mg/g).

EXAMPLE 3

Following the method in Example 1, but using 50 parts of the epoxy group-containing polyester resin obtained in Preparation 4, 50 parts of the carboxy group-containing acrylic resin obtained in Preparation 5, 0.7 part of Modaflow, 0.5 part of benzoin, 45 parts of titanium white (rutile structure) and 0.1 part of 2- methylimidazole, there was obtained a powder coating. By using the coating, test pieces were prepared.

EXAMPLE 4

Following the method in Example 1, but using 95 parts of the epoxy group-containing polyester resin obtained in Preparation 1, 5 parts of 1,2,3,4-butanetetracarboxylic acid, 0.7 part of Modaflow, 0.5 part of benzoin, 45 parts of titanium white (rutile structure) and 0.1 part of 2-methylimidazole, there was obtained a powder coating. By using the coating, test pieces were prepared.

PREPARATION 6

Carboxy group-containing polyester resin

592 Parts of terephthalic acid, 327 parts of neopentyl glycol, 13 parts of ethylene glycol, 53 parts of trimethylolethane and 5 parts of dibutyltin oxide were placed in a reaction vessel, heated first at 180° C. for 5 hours then at 220° C. to proceed with the reaction. The reaction mixture was then maintained at 180° C., 64 parts of trimellitic acid anhydride were added thereto, and the whole mixture was further reacted for 2 hours to give a carboxy group-containing polyester resin having the acid value of 40 (KOH mg/g) and the softening point of 120° C.

COMPARISON 1

Following the method in Example 1, but using 88 parts of the carboxy group-containing polyester resin obtained in Preparation 6, 12 parts of Epikote 828, 0.7 part of Modaflow, 0.5 part of benzoin, 45 parts of titanium white (rutile structure) and 0.1 part of 2-methylimidazole, there was obtained a powder coating. By using the coating, test pieces were prepared.

PREPARATION 7

Carboxy group-containing polyester resin 1,161 Parts of terephthalic acid, 267 parts of ethylene glycol, 606 parts of neopentyl glycol, 56 parts of trimethylolpropane and 10 parts of dibutyltin oxide were placed in a reaction vessel and heated first at 180° C. for 5 hours then at 220° C. for 10 hours to proceed with the reaction. 320 Parts of monomethyl terephthalate and 1 part of zinc acetate were added the reaction mixture, and the whole mixture was further heated at 200° C. to give a carboxy group-containing polyester resin having the acid value of 50 (KOH mg/g) and the softening point of 117° C.

COMPARISON 2

Following the method in Example 1, but using 50 parts of the carboxy group-containing polyester resin obtained in Preparation 7, 50 parts of Epikote 1004, 0.7 part of Modaflow, 0.5 part of benzoin, 45 parts of titanium white (rutile structure) and 0.1 part of 2-methylimidazole, there was obtained a powder coating. By using the coating, test pieces were prepared. Test results by the use of powder coatings and test pieces obtained in Examples 1 to 4 and Comparisons 1 and 2 are shown in the following Table.

|  | Example | | | | Comparison | |
| --- | --- | --- | --- | --- | --- | --- |
|  | 1 | 2 | 3 | 4 | 1 | 2 |
| Gloss[1] | 98 | 97 | 97 | 98 | 96 | 98 |
| Erichsen value (mm) | >8 | >8 | >8 | >8 | >8 | >8 |
| Impact value (cm)[2] | | | | | | |
| 500 g | >50 | >50 | >50 | >50 | >50 | >50 |
| 1 Kg | >50 | >50 | 30 | >50 | 30 | >50 |
| Corrosion resistance (mm)[3] | 0 | 0 | 1 | 0 | 1 | 0 |
| Accelerated weathering (%)[4] | 86 | 98 | 99 | 87 | 87 | 10 |
| Stain resistance[5] | II | II | I | I-II | II | II |
| Anti-blocking property[6] | I | I | I | I | III | I |

Remarks:
[1]Reflection rate on mirror at angle 60°.
[2]Load with 500 g and 1 Kg, respectively.
[3]Salt spray test: 35° C., 5% aqueous NaCl soln., peeling off of plastic tape after 500 hours.
[4]Sunshine Weather-O-Meter, gloss retention (%) after 300 hours.
[5]Degree of stain with fast drying ink (black) when wiped with a mixture of xylene and butanol, after 24 hours at 25° C. I; no trace observed. II; slight trace observed. III; trace observed.
[6]State of powder coatings after storage at 35° C. for 7 days. I; flowable by slight shock. II; flowable by light shock, small agglomarates observed. III; agglomarate as a whole.

As will be evident from the above results, the thermosetting resin compositions according to the invention are quite suitable for powder coatings, which possess superior mechanical properties (e.g. Erichsen value and impact value), corrosion resistance, exterior exposure and anti-blocking property.

They may be used especially for coating of household electric appliances, car body and building materials.

I claim:

1. A thermosetting resin composition which comprises, as the main components, (A) an epoxy group-containing polyester resin obtained by reacting a hydroxy group-containing polyester resin with an epoxy ester resin intermediate having both epoxy and alkyl ester groups, which intermediate being obtained, in turn, by reacting a polyepoxy compound having at least two epoxy groups with a monoalkyl terephthalate, and (B) a hardener containing two or more carboxy groups.

2. A thermosetting resin composition as claimed in claim 1 in which said epoxy group-containing polyester resin contains at least 70 mole % aromatic carboxylic acid (where an aromatic hydroxycarboxylic acid is used, it is calculated as the member of said aromatic carboxylic acid) based on the total carboxylic acid constituents, and has the softening point of from 50° to 200° C.

3. A thermosetting resin composition as claimed in claim 1 in which said polyepoxy compound is selected from the group consisting of a bisphenol type epoxy resin, a hydrogenated bisphenol type epoxy resin and tris(2-epoxypropyl)isocyanurate.

4. A thermosetting resin composition as claimed in claim 1 in which said monoalkyl terephthalate is monomethyl terephthalate.

5. A thermosetting resin composition as claimed in claim 1 in which said hardener is selected from the group consisting of an aliphatic carboxylic acid, a carboxy group-containing polyester resin and a carboxy group-containing acrylic resin.

6. A thermosetting resin composition as claimed in claim 5 in which said aliphatic carboxylic acid is 1,2,3,4-butanetetracarboxylic acid and/or dodecanedioic acid.

7. A process for preparing an epoxy group-containing polyester resin which comprises reacting an epoxy ester resin intermediate (A') having both epoxy and alkyl ester groups, which intermediate being obtained, in turn, by reacting a polyepoxy compound having at least two epoxy groups with a monoalkyl terephthalate, with a hydroxy group-containing polyester resin (B').

8. A process as claimed in claim 7 in which said epoxy group-containing polyester resin contains at least 70 mole % aromatic carboxylic acid (where an aromatic hydroxy-carboxylic acid is used, it is calculated as the member of said aromatic carboxylic acid) based on the total carboxylic acid constituents.

9. A process as claimed in claim 7 in which said epoxy group-containing polyester resin has the softening point of from 50° to 200° C.

10. A process as claimed in claim 7 in which said polyepoxy compound is selected from the group consisting of a bisphenol type epoxy resin, a hydrogenated bisphenol type epoxy resin and tris(2-epoxypropyl)isocyanurate.

11. A process as claimed in claim 7 in which said monoalkyl terephthalate is monomethyl terephthalate.

* * * * *